(12) United States Patent
Brown et al.

(10) Patent No.: US 9,747,198 B2
(45) Date of Patent: *Aug. 29, 2017

(54) PROCESSING A POINT-IN-TIME COPY ESTABLISH COMMAND TO COPY DATA

(71) Applicant: International Business Machines Corporation, Armonk, NY (US)

(72) Inventors: Theresa M. Brown, Tucson, AZ (US); Nedlaya Y. Francisco, Tucson, AZ (US); Carol S. Mellgren, Tucson, AZ (US); Jared M. Minch, Tucson, AZ (US); Raul E. Saba, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/731,345

(22) Filed: Jun. 4, 2015

(65) Prior Publication Data

US 2015/0269069 A1   Sep. 24, 2015

Related U.S. Application Data

(63) Continuation of application No. 14/070,384, filed on Nov. 1, 2013, now Pat. No. 9,104,626, which is a
(Continued)

(51) Int. Cl.
*G06F 12/00* (2006.01)
*G06F 12/02* (2006.01)
(Continued)

(52) U.S. Cl.
CPC ............ *G06F 12/023* (2013.01); *G06F 3/065* (2013.01); *G06F 3/0614* (2013.01);
(Continued)

(58) Field of Classification Search
None
See application file for complete search history.

(56) References Cited

U.S. PATENT DOCUMENTS 6,041,386 A * 3/2000 Bello ................. G06F 3/0607
  711/112
6,611,901 B1   8/2003 Micka et al.
(Continued)

FOREIGN PATENT DOCUMENTS

CN           1704903        12/2005
CN        100418062 C        6/2006
(Continued)

OTHER PUBLICATIONS

Response dated Jun. 23, 2015, pp. 12, to Final Office Action dated May 23, 2015, pp. 21 for U.S. Appl. No. 13/653,342, filed Oct. 16, 2012.
(Continued)

*Primary Examiner* — Daniel Tsui
(74) *Attorney, Agent, or Firm* — David W. Victor; Konrad Raynes Davda & Victor, LLP

(57) ABSTRACT

Provided are a computer program product, system, and method for processing a copy command indicating a source set comprising a subset of source logical addresses to copy to an indicated target set comprising a subset of target logical addresses. Complete is expected to be returned to the copy command in response to completing the copying of the source set to the target set. A point-in-time (PiT) copy establish command is generated in response to receiving the copy command, indicating the source and target sets in the copy command, The generated PiT copy command is executed to generate copy information indicating the source and target sets of source logical addresses and whether they have been copied to the target set. Complete is returned to
(Continued)

the copy command after generating the copy information and before copying all the source logical addresses to the target logical addresses.

26 Claims, 8 Drawing Sheets

Related U.S. Application Data continuation of application No. 13/653,347, filed on Oct. 16, 2012, now Pat. No. 9,116,852.

(51) Int. Cl.
  *G06F 11/14* (2006.01)
  *G06F 3/06* (2006.01)
(52) U.S. Cl.
  CPC ........ *G06F 3/0683* (2013.01); *G06F 11/1464* (2013.01); *G06F 11/1446* (2013.01); *G06F 2212/1032* (2013.01); *G06F 2212/152* (2013.01)

(56) References Cited

U.S. PATENT DOCUMENTS

| | | | |
|---|---|---|---|
| 6,757,797 | B1 | 6/2004 | Kaiya et al. |
| 6,996,586 | B2 | 2/2006 | Stanley et al. |
| 7,509,535 | B1 | 3/2009 | Gulve et al. |
| 9,104,626 | B2* | 8/2015 | Brown ................ G06F 11/1464 |
| 9,116,852 | B2* | 8/2015 | Brown ................ G06F 11/1464 |
| 9,135,121 | B2 | 9/2015 | Brown et al. |
| 9,405,704 | B2 | 8/2016 | Brown et al. |
| 2003/0028737 | A1 | 2/2003 | Kaiya et al. |
| 2004/0221125 | A1 | 11/2004 | Ananthanarayanan et al. |
| 2005/0188251 | A1 | 8/2005 | Benhase et al. |
| 2006/0129773 | A1 | 6/2006 | Watanabe et al. |
| 2008/0244205 | A1 | 10/2008 | Amano et al. |
| 2009/0144345 | A1 | 6/2009 | Werner et al. |
| 2009/0187613 | A1* | 7/2009 | Spear ................ G06F 11/2082 |
| 2009/0198940 | A1 | 8/2009 | Ash et al. |
| 2011/0219192 | A1 | 9/2011 | Hutchison et al. |
| 2012/0079224 | A1* | 3/2012 | Clayton .............. G06F 11/1456 711/162 |
| 2012/0173830 | A1 | 7/2012 | Gundy et al. |
| 2012/0216000 | A1 | 8/2012 | Thompson et al. |
| 2012/0221816 | A1 | 8/2012 | Hutchison et al. |
| 2012/0278559 | A1 | 11/2012 | Hutchison et al. |
| 2014/0108750 | A1 | 4/2014 | Brown et al. |
| 2014/0108751 | A1 | 4/2014 | Brown et al. |
| 2014/0108752 | A1 | 4/2014 | Brown et al. |
| 2014/0108757 | A1 | 4/2014 | Brown et al. |
| 2015/0370722 | A1 | 12/2015 | Brown et al. |

FOREIGN PATENT DOCUMENTS

| | | |
|---|---|---|
| CN | 101206596 | 6/2008 |
| CN | 101276300 | 10/2008 |
| EP | 2 214 102 | 1/2010 |
| JP | 2001166974 | 6/2001 |
| JP | 2004326801 | 11/2004 |
| JP | 2006164162 | 6/2006 |
| JP | 2012507097 | 3/2012 |
| WO | 2004051473 | 6/2004 |

OTHER PUBLICATIONS

Notice of Allowance dated Jul. 22, 2015, pp. 15, for U.S. Appl. No. 13/653,342, filed Oct. 16, 2012.
U.S. Appl. No. 14/735,539, filed Jun. 10, 2015.
"DFSMS Advanced Copy Services", IBM Corporation, IBM Document No. SC35-0428-18, 1994, pp. 1-815.
Rooney et al., "IBM TotalStorage Productivity Center for Replication for z/OS", IBM Corporation, IBM Systems Journal, vol. 47, No. 4, 2008, pp. 681-694.
"Working Draft SCSI Extended Copy Command", T10/99-143r1, Apr. 2, 1999, pp. 1-34.
"FlashCopy establish (FCESTABL) command", IBM Corporation, [online][retrieved Aug. 28, 2012] http://publib.bouder.ibm.com/infocenter/zos/v1r12/topic/com.ibm.zos.rl. . . .
PCT International Search Report and Written Opinion dated May 16, 2014, pp. 10, for Application No. PCT/IB2013/059346, filed Oct. 14, 2013.
English translation of JP2001166974 dated Jun. 22, 2001.
English translation of JP2004326801 dated Nov. 18, 2004.
English translation of JP2006164162 dated Jun. 22, 2006.
English translation of JP2012507097 dated Mar. 22, 2012.
UK Examination Report dated May 11, 2015, for Serial No. GB1506963.6, filed Oct. 14, 2013.
Search Report WO 2014060934 Apr. 24, 2014 IBM Corp.
Office Action dated Oct. 6, 2014, pp. 28 for U.S. Appl. No. 13/653,342, filed Oct. 16, 2012.
Response dated Jan. 6, 2015, pp. 16, to Office Action dated Oct. 6, 2014, pp. 28 for U.S. Appl. No. 13/653,342, filed Oct. 16, 2012.
Final Office Action dated Mar. 23, 2015, pp. 21 for U.S. Appl. No. 13/653,342, filed Oct. 16, 2012.
Office Action dated Oct. 23, 2014, pp. 22, for U.S. Appl. No. 13/653,347, filed 2012-16.
Response dated Jan. 23, 2015, pp. 8, to Office Action dated Oct. 23, 2014, pp. 22, for U.S. Appl. No. 13/653,347, filed 2012-16.
Notice of Allowance dated Apr. 1, 2015, pp. 11, for U.S. Appl. No. 13/653,347, filed 2012-16.
Office Action dated Oct. 24, 2014, pp. 18, for U.S. Appl. No. 14/070,384, filed Nov. 1, 2013.
Response dated Jan. 23, 2015, pp. 4, to Office Action dated Oct. 24, 2014, pp. 18, for U.S. Appl. No. 14/070,384, filed Nov. 1, 2013.
Notice of Allowance dated Apr. 1, 2015, pp. 11, for U.S. Appl. No. 14/070,384, filed Nov. 1, 2013
Office Action dated Oct. 23, 2014, pp. 27, for U.S. Appl. No. 13/653,349, filed Oct. 16, 2012.
Response dated Jan. 23, 2015, pp. 14, to Office Action dated Oct. 23, 2014, pp. 27, for U.S. Appl. No. 13/653,349, filed Oct. 16, 2012.
Notice of Allowance dated Apr. 2, 2015, pp. 11, for U.S. Appl. No. 13/653,349, filed Oct. 16, 2012.
PCT International Search Report and Written Opinion dated Mar. 11, 2014, pp. 9, for Application No. PCT/IB2013/059345, filed Oct. 14, 2013.
U.S. Appl. No. 14/842,725, filed Sep. 1, 2015.
Notice of Allowance dated Apr. 18, 2016, pp. 9, for U.S. Appl. No. 13/653,342, filed Oct. 16, 2012.
Final Office Action dated Mar. 24, 2017, pp. 23, for U.S. Appl. No. 14/735,539, filed Jun. 10, 2015.
Office Action dated Oct. 4, 2016, pp. 41, for U.S. Appl. No. 14/735,539, filed Jun. 10, 2015.
Office Action dated Nov. 3, 2016, pp. 41, for U.S. Appl. No. 14/842,725, filed Sep. 1, 2015.
Response dated Jan. 4, 2017, pp. 13, to Office Action dated Oct. 4, 2016, pp. 41, for U.S. Appl. No. 14/735,539, filed Jun. 10, 2015.
Response dated Feb. 3, 2017, pp. 13, to Office Action dated Nov. 3, 2016, pp. 41, for U.S. Appl. No. 14/842,725, filed Sep. 1, 2015.
Chinese Office Action dated Nov. 7, 2016, pp. 8, for Application No. 201380054162.7.
Information Materials for IDS dated Nov. 14, 2016, pp. 2 to Chinese Office Action dated Nov. 7, 2016, pp. 8, for Application No. 201380054162.7.
English translation of CN100418062C dated Jun. 14, 2006.
English translation of Chinese Office Action dated Nov. 7, 2016, pp. 8, for Application No. 201380054162.7.
US20060129773 is an English language counterpart of CN10048062C.
Notice of Allowance dated Apr. 14, 2017, pp. 25, for U.S. Appl. No. 14/842,725, filed Sep. 1, 2015.
Notice of Allowance dated Jun. 14, 2017, pp. 11, for U.S. Appl. No. 14/735,539, filed Jun. 10, 2015.

* cited by examiner

| 52 | 54 | 56 | 58 | 60 | 62 — 50 |
|---|---|---|---|---|---|
| Command | First Source Logical Address | Last Source Logical Address | First Target Logical Address | Last Target Logical Address | Other Parameters (Background Copy, Persistent Copy) |

Point-in-Time (PiT) Copy Establish Command

FIG. 2

| 72 | 74 | 76 | 78 | 80 — 70 |
|---|---|---|---|---|
| PiT Copy ID | First Source Logical Address | First Target Logical Address | Number Logical Address to Copy | Other Parameters (Background Copy, Persistent Copy) |

Source/Target Relationship Information

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 0 | 0 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

Copy Map

FIG. 4

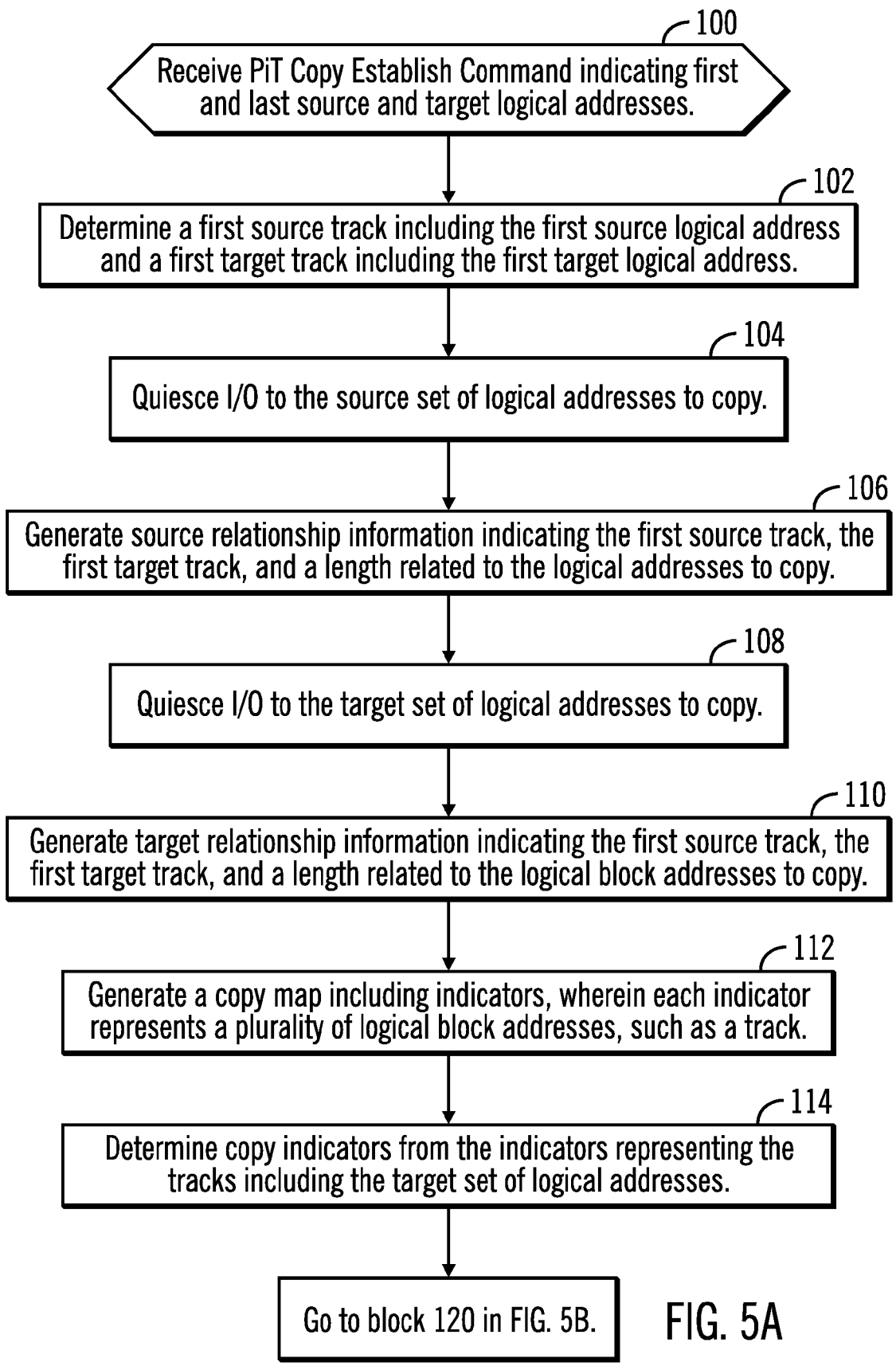

Copy Command

PROCESSING A POINT-IN-TIME COPY ESTABLISH COMMAND TO COPY DATA

CROSS-REFERENCE TO RELATED APPLICATION

This application is a continuation of U.S. patent application Ser. No. 14/070,384, filed Nov. 1, 2013, which is a continuation of U.S. patent application Ser. No. 13/653,347, filed Oct. 15, 2012, which applications are incorporated herein by reference in their entirety.

BACKGROUND OF THE INVENTION

1. Field of the Invention

The present invention relates to a computer program product, system, and method for processing a copy command directed to a first storage architecture for data that is stored in a second storage architecture.

2. Description of the Related Art

Hosts in a data storage environment may submit data to a storage controller 2 that manages access to one or more storage devices. Hosts may be configured to use a set of data management commands for a Fixed Block Address (FBA) format, where data is expressed in fixed size Logical Block Addresses (LBAs). One such data management command is the SCSI extended copy (XCOPY) command that specifies a range of source logical addresses to copy to target logical addresses in one or more logical volumes.

There is a need in the art for improved techniques for a storage controller to implement a copy command from a host expressing the source and target data as logical addresses.

SUMMARY

Provided are a computer program product, system, and method for processing a copy command directed to a first storage architecture for data that is stored in a second storage architecture. The copy command indicates a source set comprising a subset of source logical addresses in at least one storage to copy to an indicated target set comprising a subset of target logical addresses in the at least one storage. Complete is expected to be returned to the copy command in response to completing the copying of the source set to the target set. A point-in-time (PiT) copy establish command in response to receiving the copy command. The PiT copy establish command indicates the source and target sets in the copy command, wherein the source logical addresses map to source tracks in the source device and wherein the target logical addresses map to target tracks. The generated PiT copy command is executed and in response to executing the PiT copy establish command, copy information is generated indicating the source set of source logical addresses and the target set of target logical addresses and indicating whether the source logical addresses in the source set have been copied to the target set. Complete is returned to the copy command after generating the copy information and before copying all the source logical addresses to the target logical addresses.

BRIEF DESCRIPTION OF THE DRAWINGS

FIG. 2 illustrates an embodiment of a Point-in-Time (PiT) copy establish command to establish a PiT copy relationship.

FIG. 3 illustrates an embodiment of source/target relationship information.

FIG. 4 illustrates an embodiment of a copy map for the PiT copy relationship.

FIGS. 5a and 5b illustrate an embodiment of operations to establish a PiT copy relationship.

DETAILED DESCRIPTION

Described embodiments provide techniques for processing a copy command from a host that is intended for a data storage architecture that is different from the data storage architecture in which the data to copy is stored. For instance, the copy command may be expressed in FBAs, whereas the controller processing the command may store the data in a track architecture. In the described embodiments, the controller generates a PiT copy establish command for the source and target logical addresses specified in the copy command and executes the PiT copy establish command to establish the PiT copy relationship information and initiate a background copy operation to copy the data in the PiT copy relationship. Complete may be returned to the host after establishing the PiT copy relationship and before all the data is copied.

Figure 1:
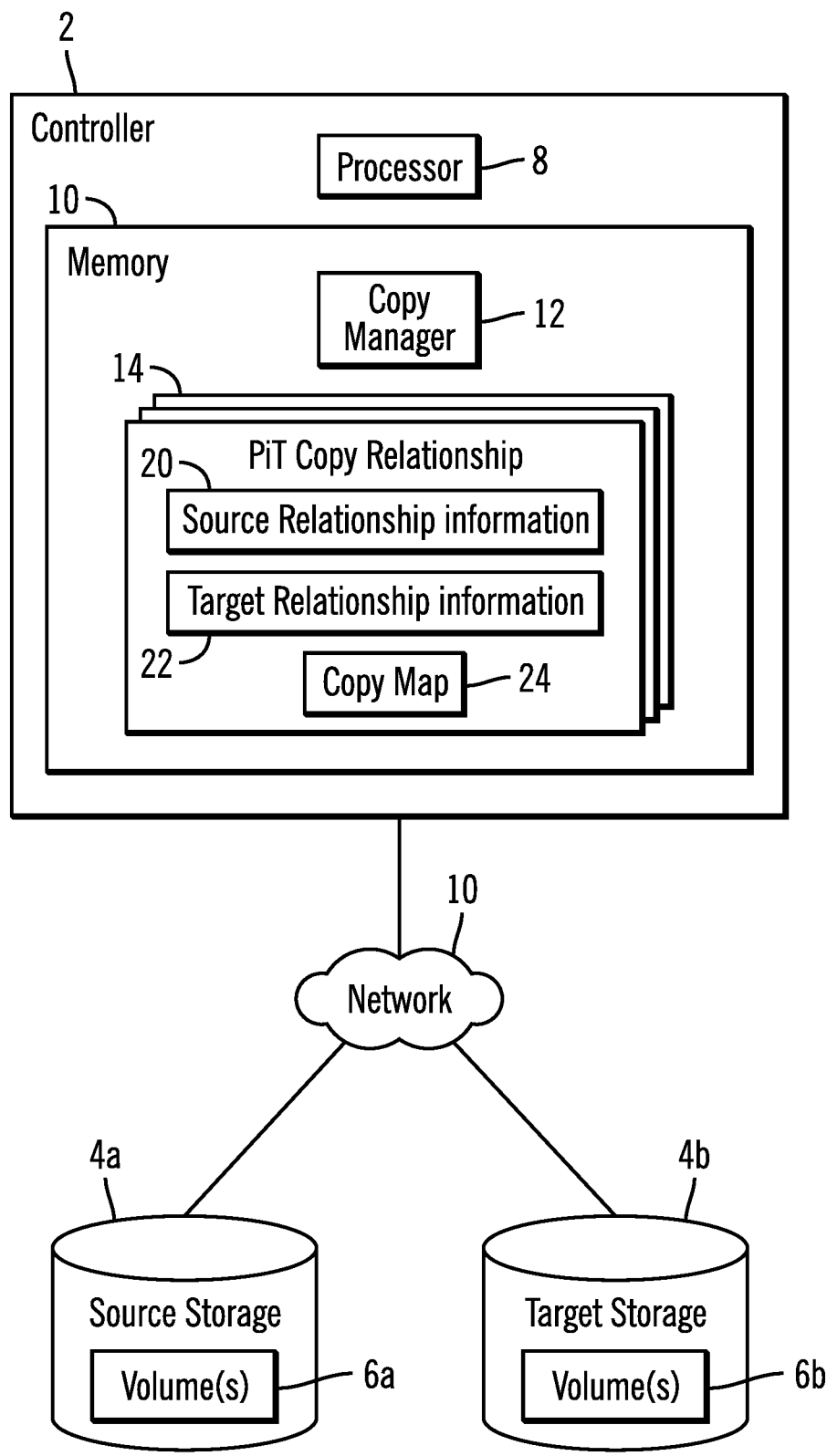
FIG. 1 illustrates an embodiment of a computing environment.

FIG. 1 illustrates an embodiment of a computing environment having a controller 2 to copy data from a coupled source storage 4a having one or more logical volumes 6a to a coupled target storage 4b having one or more volumes 6b. The controller 2 includes a processor 8 and memory 10. Hosts (not shown) may direct read and write requests to the first controller 6a to access tracks in the first storage 4a and the second storage 4b. A host write to a track in the first storage 4a in a point-in-time ("PiT") copy relationship 16 may result in the replication of that track to the second storage 4b. In a further embodiment, the target storage 4b may be coupled to a target controller, so that the controller 2 would communicate the PiT data being copied to the target controller to manage the copying to the target storage 4b. The controller 2 may communicate with the storages 4a, 4b over a network 10.

The memory 10 includes a copy manager 12 to copy data from the source storage 4a to the target storage 4b as specified in one or more PiT copy relationships 14. A copy relationship 14 may identify source logical addresses in a source volume 6a to copy to target logical addresses in a target volume 6b. Alternatively, both the source and target logical addresses in the PiT copy relationship 14 may be in a same volume in one of the storages 4a, 4b. The data to copy in the copy relationship 14 may be part of a consistency session or consistency group, such that data is copied in a manner to maintain consistency across all dependent data, so that the order of dependent writes is preserved to make the data consistent as of a point-in-time.

The PiT copy relationship 14 includes source relationship information 20 and target relationship information 22 both providing information on the source and target tracks involved in the copy operation. This information is used to manage I/O requests to the source and target volumes to determine if the I/O requests are to tracks involved in a PiT copy operation. The PiT copy relationship 14 further includes a copy map 24 indicating tracks in the target volume 6*b* to which source logical addresses in the source set need to be copied.

The copy manager 12 may implement a PiT program such as IBM FlashCopy®, snapshot, and other PiT programs, to perform a PiT copy operation between specified source and target logical addresses in the same or different volumes. or volume. (FlashCopy is a registered trademark of International Business Machines, Corp. or "IBM"). The PiT copy operation may be between a source set of source logical addresses comprising a subset of the logical addresses in a source volume 6*a* and a target set of target logical addresses comprising a subset of the logical addresses in a target volume 6*b*. The logical addresses may comprise logical block addresses (LBAs) that map to contiguous tracks in the volumes 6*a*, 6*b*.

The copy manager 12 is shown in FIG. 1 as program code loaded into the memory 10 and executed by the processor 8. Alternatively, some or all of the functions of the copy manager 12 may be implemented in hardware devices in the controllers 6*a*, 6*b*, such as in Application Specific Integrated Circuits (ASICs), Field Programmable Gate Array (FPGA), etc. The controller 2 may include other programs not shown, such as an operating system and application programs.

The memory 10 may comprise one or more volatile or non-volatile storage devices, such as a Dynamic Random Access Memory (DRAM), Random Access Memory (RAM) or a non-volatile memory, e.g., battery backed-up Random Access Memory (RAM), static RAM (SRAM), solid state storage devices (SSDs), etc.

The storages 4*a*, 4*b* may each comprise one or more storage devices known in the art, such as interconnected storage devices, where the storage devices may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The storages 4*a* and 4*b* may store tracks in a Redundant Array of Independent Disks (RAID) configuration where strides of tracks are written across multiple storage devices comprising the storages 4*a*, 4*b*. ranks.

The network 10 may comprise a network such as a Local Area Network (LAN), Storage Area Network (SAN), Wide Area Network (WAN), peer-to-peer network, wireless network, etc.

FIG. 2 illustrates an embodiment of a PiT copy establish command 50 that is submitted within the controller 2 or from an attached host to cause the copy manager 12 to generate a PiT copy relationship 14. The PiT copy establish command 50 includes a command field 52 specifying the PiT copy establish command; a first source logical address 54 to be copied; a last source logical address 56 to be copied; a first target logical address 58 to which the first source logical address 54 is copied; and a last target logical address 60 to which the last source logical address 56 is copied; and other parameters 62, such as a background copy parameter indicating whether a background operation is performed to copy the source logical address to the target logical addresses and indicating whether the source logical addresses should remain persistent after being copied. The command 50 further would indicate the source volume 6*a* including the source logical addresses and the target volume 6*b* including the target logical addresses in the PiT copy relationship 14 being established. Additional information may further be indicated, such as the source 6*a* and target 6*b* volumes or single volume 6*a*, 6*b* in which the copy operation is being performed. The source and target logical addresses may be stored in data storage devices other than logical volumes. From the range of first 54 and last 56 source logical addresses, the number of logical addresses to copy may be determined.

When processing the PiT copy establish command 50, the copy manager 14 generates data structures and information for the PiT copy relationship 14 as shown in FIGS. 3 and 4.

FIG. 3 shows fields 70 included in the source 20 and target 22 relationship information, which includes a PiT copy identifier (ID) 72 identifying the PiT copy for the information; a first source logical address 74 including the first source logical address 54 to copy; a first target logical address 76 to which the first source logical address 74 is copied; a length related to a number of the logical addresses to copy 78, such as in the field 58; and the other parameters 80, such as included in the field 60. The number of logical addresses to copy 78 may alternatively be expressed in other storage units, such as the number of target tracks or extents to copy. The source and target relationship information 70 would further indicate the source volume 6*a* including the source logical addresses and the target volume 6*b* including the target logical addresses in the relationship 14. The source and target relationship information 70 may be used to manage access to the source 6*a* and target 6*b* volumes, respectively, while the PiT copy relationship 14 is active.

FIG. 4 illustrates and embodiment of a copy map 24, which may comprise a bitmap that includes a cell for each track in the target volume 6*b*, or target location, including the target set of logical addresses. The cells for the target tracks including the target set of target logical address to receive source logical addresses are set to indicate copy, e.g., "1". The cells representing tracks in the target volume 6*b* that are not part of the PiT copy relationship, i.e., excluding the target tracks including the target set, may have a value to indicate that they are not to be copied, e.g., "0". Other values and settings could be used to indicate the tracks to copy and the tracks not to copy as part of the PiT copy relationship being established. Thus, each cell set to indicate to copy represents a plurality of target logical addresses involved in the copy operation.

The cells, indicators, in the copy map 24 may each represent a target group of target logical addresses, including target logical addresses in involved in the copy relationship tracks 14. The target groups represented by the indicators, cells, in the copy map 14 may each represent groupings of logical addresses other than tracks. In a further embodiment, the copy map 24 may indicate tracks in the source volume 6*a* having the source set of logical addresses to copy.

FIGS. 3, 4, and 5 provide an embodiment of information included in the PiT copy establish command, the source and target relationship information, and the copy map. This information described as included in these data structures and commands is not considered to be limiting, and additional and modified information may be included in different embodiments. Further, the information described in FIGS. 3, 4, and 5 may be separated into additional commands and data structures.

Figure 5B:
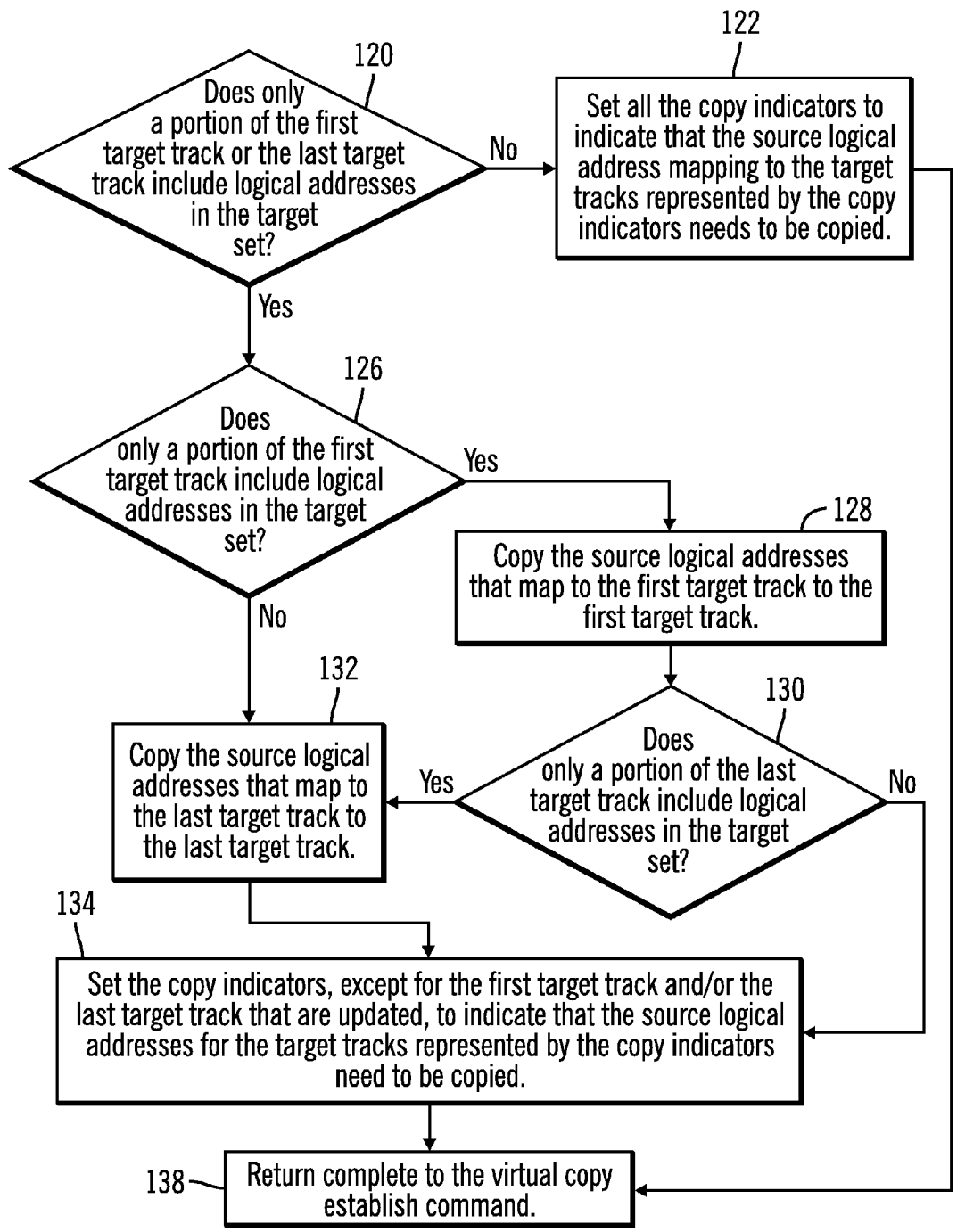

FIGS. 5*a* and 5*b* illustrate an embodiment of operations performed by the copy manager 12 to process a PiT copy establish command 50 to establish a PiT copy relationship 14, such as a FlashCopy establish command, e.g., FCES-TABL. With respect to FIG. 5a, the copy manager 12 receives (at block 100) a PiT Copy Establish Command 50 indicating the first 54 and last 56 source logical addresses and the first 58 and last 60 target logical addresses. The copy manager 12 determines (at block 102) a first source track including the first source logical address 54 and a first target track including the first target logical address 56 to which the data is copied. The copy manager 12 would use a volume map to determine the mapping of logical addresses to tracks in the storages 4a, 4b. The copy manager 12 quiesces (at block 104) Input/Output (I/O) operations to the source set of logical addresses to copy. The copy manager 12 then generates (at block 106) source relationship information 20 indicating the first source track 74, the first target track 76, and the length 78 related to the logical block addresses to copy. The copy manager 12 further quiesces (at block 108) I/O operations to the target set of logical addresses to be updated. The copy manager 12 generates (at block 110) target relationship information 24 indicating the first source logical address 74, the first target logical address 76, and a number of logical addresses to copy 78. In the quiesce operations at block 104 and 108, the copy manager 12 may quiesce I/O to only the determined source set and target set of logical addresses to copy or to tracks including the source and target sets of logical addresses. Alternatively, the quiesce of I/O may be to the entire volumes 6a, 6b.

The copy manager 12 generates (at block 112) a copy map 24 including indicators, e.g., cells, wherein each indicator represents a plurality of logical block addresses, such as a track. The copy manager 12 determines (at block 114) copy indicators comprising indicators in the copy map 24 representing the tracks including the target set of target logical addresses. With respect to FIG. 5b, the copy manager 12 determines (at block 120) whether only a portion of the first target track or the last target track, in the range of tracks including the target set, includes target logical addresses in the target set. If not, which means the source logical addresses to copy line up and fill each track including the target set of logical addresses, then the copy manager 12 sets (at block 122) all the copy indicators to indicate that the source logical addresses mapping to the target tracks represented by the copy indicators need to be copied.

If (from the yes branch of block 120) only a portion of the first or last target track includes logical addresses in the target set, then the copy manager 12 copies the data for those target tracks that only partially include target set logical addresses as part of establishing the PiT copy relationship 14. The copy map 24 will not indicate to copy the first or last target tracks updated as part of the establish command. In this way writes to a portion of the target track that did not include the logical addresses in the target set will not be copied as part of the PiT relationship because they copy map 24 will not indicate that the target tracks partially including PiT data need to be copied. If (at block 126) only a portion of the first target track includes logical addresses in the target set, then the copy manager 12 copies (at block 128) the source logical addresses that map to the first target track to the first target track. If (at block 130) only a portion of the last target track includes logical addresses in the target set or if (from the no branch of block 126) the first target track does not only partially store logical addresses of the target set, then the copy manager 12 copies (at block 132) the source logical address in the source set that map to the last target track to the last target track.

After copying logical addresses for the first and/or last target track (from block 132 or the no branch of block 130), the copy manager 12 sets (at block 134) the copy indicators, except for the first target track and/or the last target track that are updated, to indicate that the source logical addresses for the target tracks represented by the copy indicators needs to be copied, e.g., to one. The copy indicators for the first and/or last target track that are updated at blocks 128 and/or 132 are not set to indicate that the source tracks need to be copied. After generating the PiT relationship information and data structure (from block 122 or 130), such as the copy map 24 and after copying source logical addresses in the source set that map to partial filled first and/or last target tracks (from block 134), complete is returned (at block 138) to the application or user that initiated the PiT copy establish command 50.

In an alternative embodiment where the copy map 24 indicates source tracks having the source set of logical addresses, if the source set of source logical addresses maps to only a portion of a first source track and/or a last source track including a portion of the source set of logical addresses, then the first source track and/or the last source track only partially filled with PiT logical addresses are copied to at least one of the corresponding target tracks as part of the PiT establish relationship operation. In such case, the copy map 24 would not indicate that the first and/or last source tracks need to be copied. Further, in this alternative embodiment, the returning of the complete to the virtual copy establish command is performed in response to copying the first source track and/or the last source track to the corresponding target tracks.

After the PiT copy relationship 14 is established, hosts (not shown) may submit writes to the controller 2 for source logical addresses in the source volume 6a including data in one of the established PiT copy relationships 14. The writing of data to a source logical address in a PiT copy relationship 14 that has not been copied to the target volume 6b would trigger the copy manager 12 to perform a copy-on-write operation to copy data at the source logical addresses in the copy relationship 14 to the target storage 6b before they are updated so as to preserve the PiT relationship.

In certain described embodiments, upon receiving a write to a source logical address in a copy relationship 14, the copy manager 12 determines a target group of target logical addresses also in the copy relationship, such as a target track, that include the source logical address to update. The copy manager 12 determines the source logical addresses corresponding to the target logical addresses in the target group, and copies the determined source logical addresses to the determined target group. In this way, the mapping of the source and target logical addresses in the relationship information 70 is used to determine the source logical addresses in the copy relationship 14 that need to be copied to the target storage 6b. This type of mapping is performed because in certain described embodiments the source logical addresses in the source set are in source tracks that may be different numbered tracks than the target tracks including the target set of logical addresses to be updated by the source logical addresses in the destage group.

Figure 6:
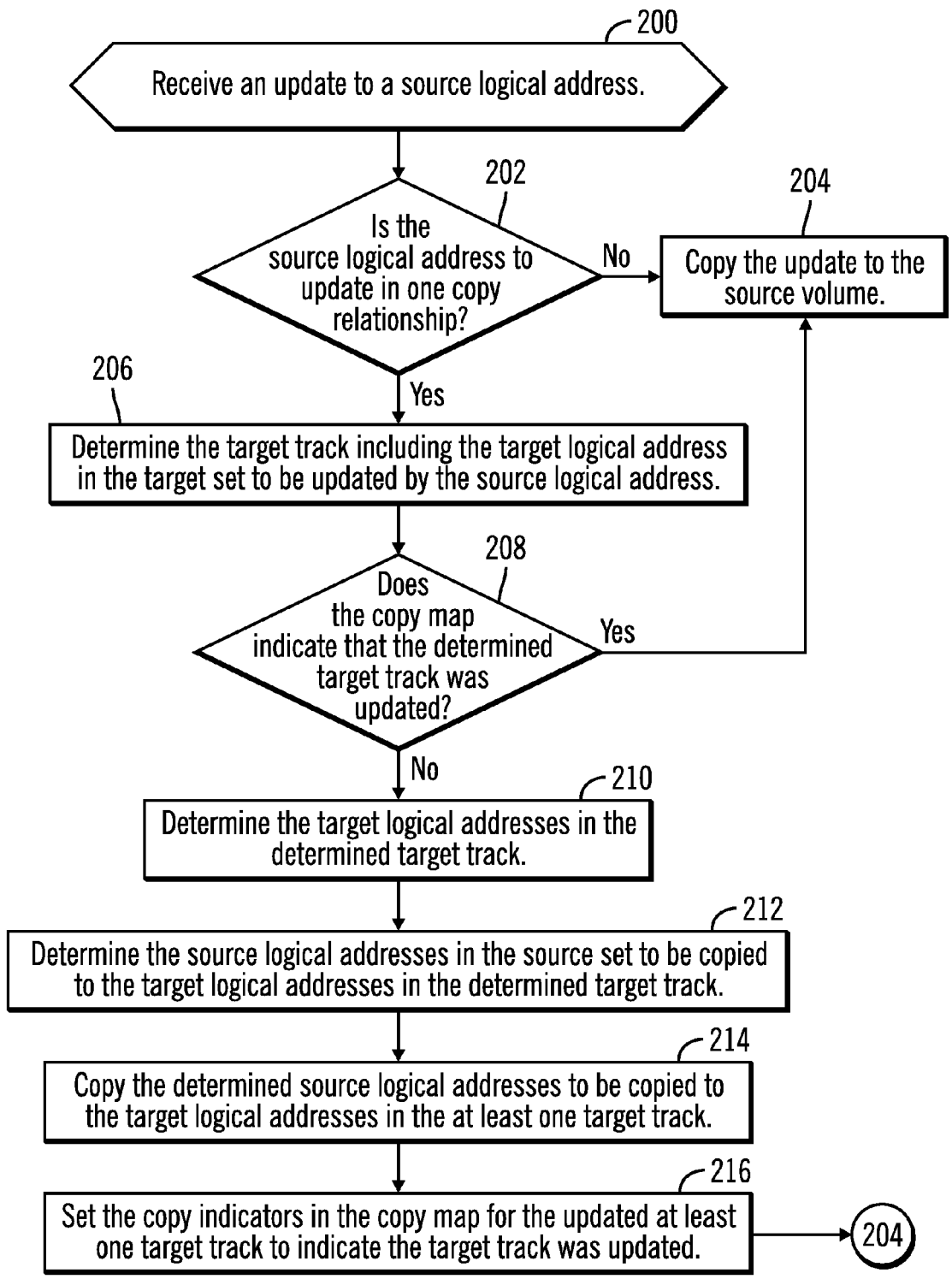
FIG. 6 illustrates an embodiment of operations to process an update to a source logical address in a PiT copy relationship.

FIG. 6 illustrates an embodiment of operations performed by the copy manager 12 to process an update to a source logical address in a source volume 6a. If a write request is directed to multiple source logical addresses, then the operations of FIG. 6 may be performed for each source logical address in the write. Upon receiving (at block 200) the update, the copy manager 12 considers the source relationship information 20 to determine (at block 202) whether the source logical address to update is within the range of source logical addresses, as defined by the first source logical address 74 and the number logical addresses 78 (FIG. 3), in one PiT copy relationship 14. If not, the copy manager 12 copies (at block 204) the update to the source volume 6*a*. If (at block 202) the source logical address to update is in one PiT copy relationship 14, then the copy manager 12 determines (at block 206) the target track including the target logical address in the target set to be updated by the source logical address being updated. This may be determined from the target relationship information 22 by determining the target logical address corresponding to the source logical address to update from the ranges of source logical addresses and target logical addresses as defined by the first source logical address 74, the second target logical address 76 and the number logical addresses to copy 78.

The copy manager 12 then determines (at block 208) whether they copy map 24 for the PiT copy relationship 14 being considered indicates that the determined target, e.g., target group, track was updated, i.e., whether the bit or indicator for the determined target track, or target group, indicates the target track was updated. The indicator may indicate the track was updated if it does not indicate the track needs to be updated or if it has a value indicating the track is current. If (from the yes branch of block 208) the determined target track to which the source logical address to update is to be copied has been updated, then the PiT data for the source logical address has already been copied to the determined target track (target group) and control proceeds to block 204 to write the update to the source logical address in the source volume 6*a*.

If (at block 208) the copy map 24 indicates the determined target track has not been updated, then the copy manager 12 determines (at block 210) the target logical addresses in the determined target track having the target logical address to update. The copy manager 12 determines (at block 212) the source logical addresses in the source set to be copied to the target logical addresses in the at least one target track. The determined source logical addresses are then copied (at block 214) to the determined target logical addresses in the target track or target group. The at least one copy indicator in the copy map 24 for the updated target track is set (at block 216) to indicate that the at least one target track was updated. After the target track is updated, control proceeds to block 204 to apply the update to the source logical address.

With the described embodiments of FIG. 6, an update to source logical addresses is processed by determining the source track including the source logical addresses that will be destaged together. The target tracks having the source logical addresses to be destaged together is then determined, and then source logical addresses are copied to corresponding target logical addresses in the copy relationship as part of performing a copy-on-write for the updated source track.

Once the copying of the source logical addresses to the at least one target track is confirmed, the source track having the source logical address to update is destaged to the source track, so that the point-in-time data is destaged and not overwritten with newer data.

Figure 7:
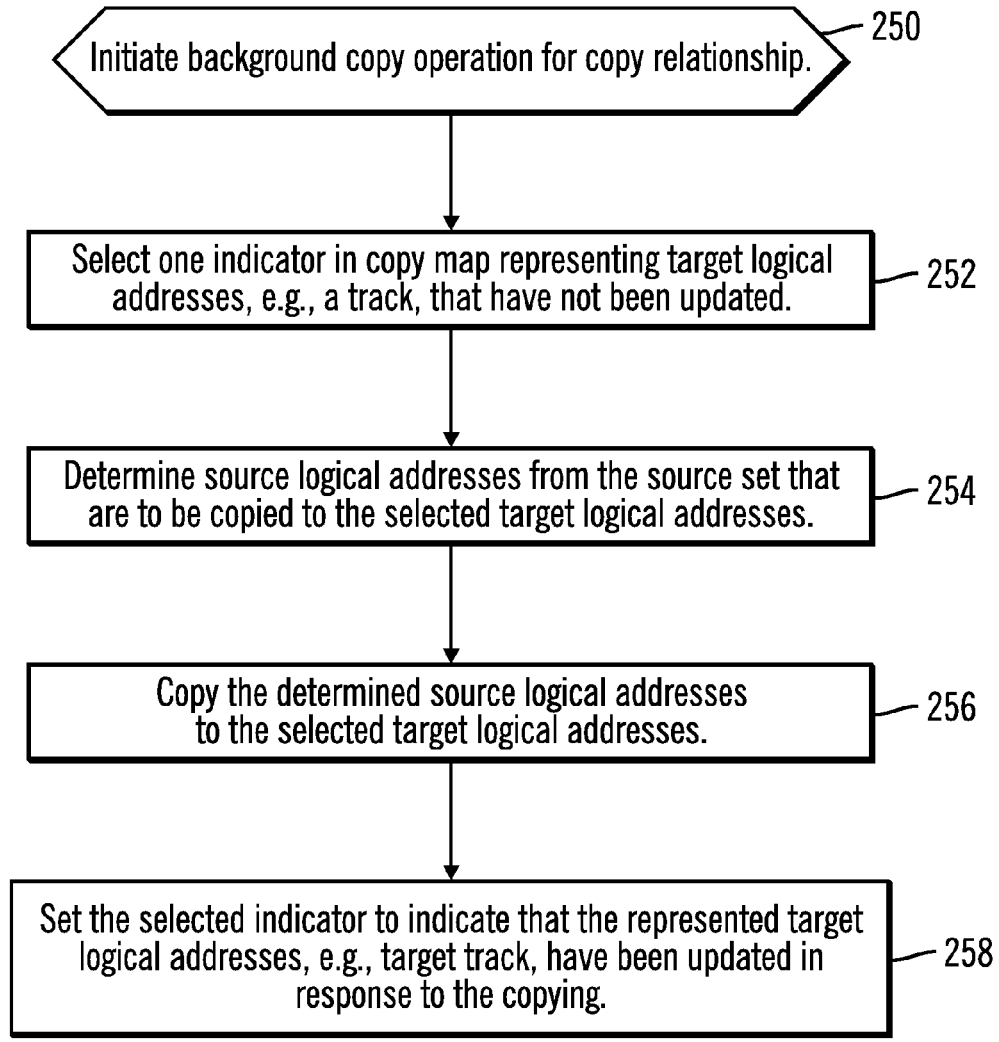
FIG. 7 illustrates an embodiment of operations to perform a background copy operations for a PiT copy relationship.

FIG. 7 illustrates an embodiment of operations performed by the copy manager 12 to copy source logical addresses to target logical addresses in the copy relationship as part of a background copy operation if the establish command 50 indicates a background copy operation 62. The background copy operation is performed to copy all the source logical addresses in the PiT copy relationship 14 to the target volume 6*b* to provide a redundant copy of the source logical addresses. Upon initiating (at block 250) the background copy operation, the copy manager 12 selects (at block 252) one indicator, e.g., bit, in the copy map 24 representing target logical addresses, e.g., a track, that have not been updated. The copy manager 12 may select a bit in the copy map 24 that that is adjacent in the copy map 24 to the last selected bit to update sequential target tracks. in the target volume 6*b*. The copy manager 12 determines (at block 254) source logical addresses from the source set that are to be copied to the selected target logical addresses. This may be determined from the source relationship information 20 from the source and target logical address ranges defined in the source relationship information 20, by determining the source logical addresses in the source range that correspond to the selected target logical addresses.

The determined source logical addresses are copied (at block 256) to the selected target track and then the selected indicator in the copy map 24 is set (at block 258) to indicate that the target track has been updated.

The described embodiments provide techniques for allowing a PiT copy establish operation to specify source and target logical addresses that map to source and target tracks having the specified source and target logical block addresses, respectively. In described embodiments, a first and/or last of the source tracks including the source logical addresses may only have a portion of the source logical addresses to copy and a first and last of the target tracks including the target logical addresses may only have a portion of the target logical addresses. In such case, the source logical addresses that map to only a portion of the first and/or last target tracks are copied to the first and/or last target tracks during the establish operation. Further, the copy map indicating target tracks that need to be updated with source tracks does not indicate that data needs to be copied for the first and/or last target tracks for which the source logical addresses are copied during the establish operation.

The described embodiments further provide techniques for handling updates to source logical addresses in a PiT copy relationship. Because source tracks are destaged in a destage group, such as a track, including the updated source logical address, the described embodiments determine the target tracks having the target logical addresses in the PiT copy relationship that are updated by source logical addresses in the source track being destaged. The source logical addresses are then copied to the corresponding target logical addresses in the determined at least one target track in the PiT copy relationship.

Described embodiments further provide techniques for performing a background copy operation of source logical addresses in a PiT copy relationship by determining a copy indicator representing a target track, determining the source logical addresses that map to the target logical addresses in the target track in the PiT copy relationship, and then copying the determined source logical addresses to the target track. The described embodiments allow the managing of updates and background copy operations for source logical addresses in a PiT copy relationship when source and target data are expressed as logical addresses and when different ranges of source and target logical addresses are specified.

Host systems (not shown) connected to the controller 2 may submit a copy command to the storage controller in a data storage format, architecture, that is different from the storage format, architecture, of the volumes 6*a*, 6*b* in the storages 4*a*, 4*b*. In one embodiment, the copy command may be intended for a Fixed Block Address (FBA) storage architecture where the data to be copied is stored in storages 4*a*, 4*b* implementing a track based data storage architecture, such as Count Key Data (CKD), where data records can be variable in length and where the tracks are expressed as a cylinder and head (CCHH) track location in the volume.

In one of many possible implementations, the copy command may comprise a Small Computer System Interface (SCSI) extended copy command (XCOPY) to copy a range of source logical addresses, source set, from a source logical volume to a range of target logical addresses, target set, in a target volume. This command is intended not to complete until all the source data is physically copied to the target data.

The described embodiments provide techniques for using a PiT copy establish command to implement the copy command from the host. This allows a host that operates in an open volume environment, e.g., FBA, to submit commands that are implemented in a track based disk storage environment.

Figure 8:
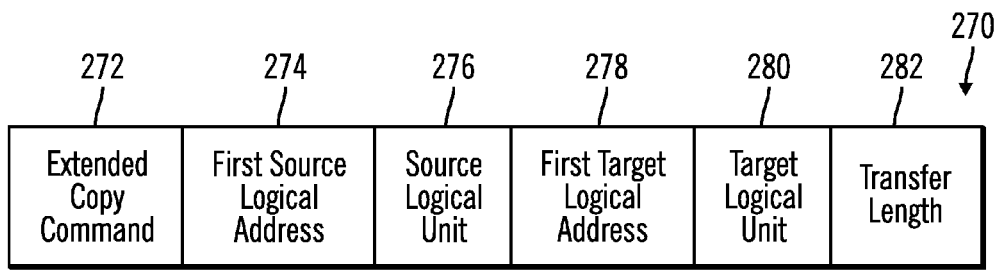
FIG. 8 illustrates an embodiment of a copy command as known in the prior art.

FIG. 8 illustrates an embodiment of a copy command 270 as known in the prior art intended for an FBA storage environment. The copy command 270 may be implemented as the SCSI extended copy (XCOPY) command. The copy command 270 includes an extended copy command 272 code identifying the command; a first source logical address in the source set of source logical addresses to copy; a source logical unit 276 identifying the volume or logical device including the source set to copy; a first target logical address 278 in the target set of target logical address to which the source logical addresses are copied; a target logical unit 280 identifying the volume or logical device including the target set of target logical addresses to be updated; and a transfer length 282 indicating a number of logical addresses to copy.

Figure 9:
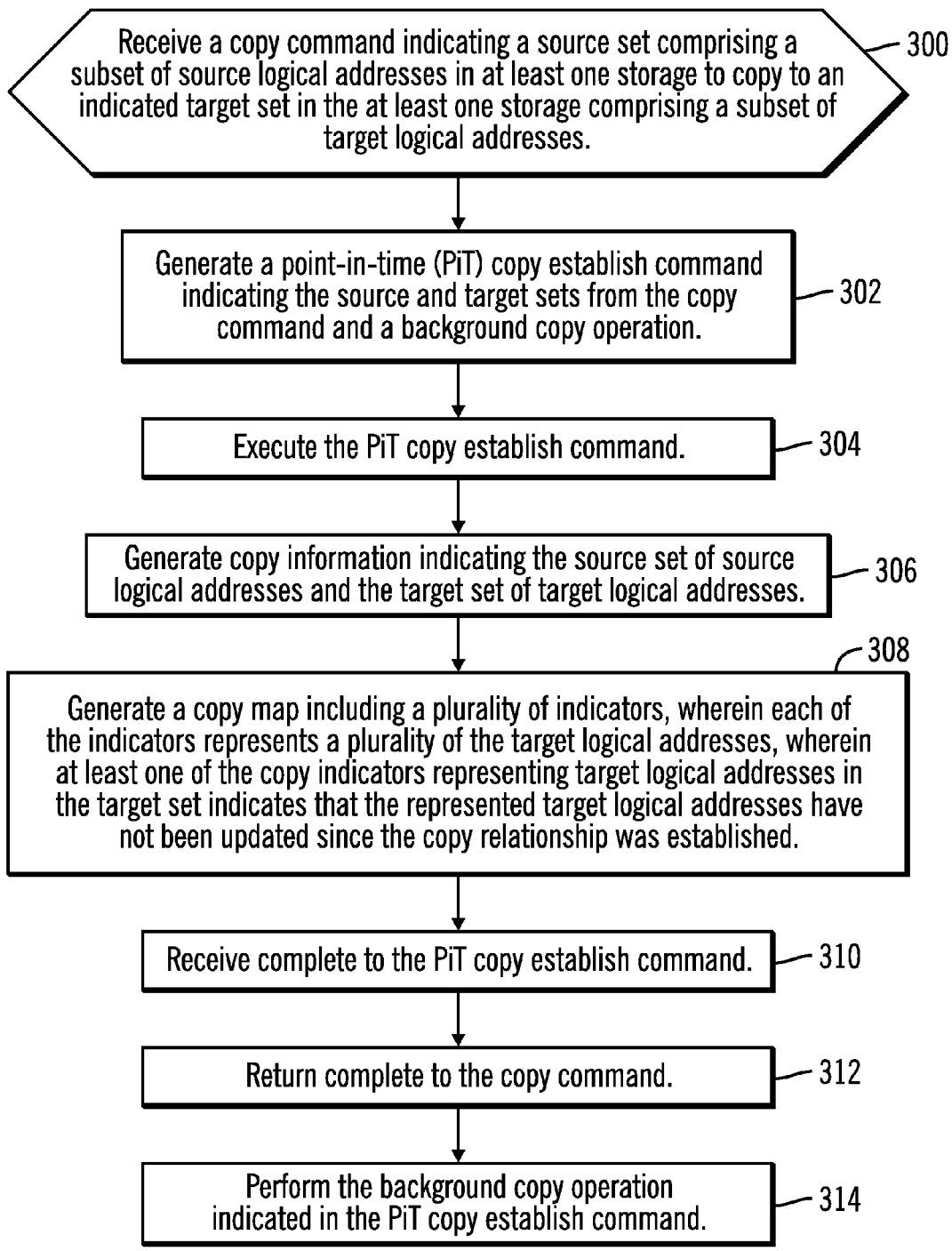
FIG. 9 illustrates an embodiment of operations to process a copy command form a host.

FIG. 9 illustrates an embodiment of operations performed by the copy manager 12 to process a copy command from a host (not shown) that is intended for a storage architecture, such as FBA, different from the storage architecture of the volumes 6a, 6b in which the data is stored, e.g., track architecture. At block 300, the copy manager 12 receives the copy command 270 indicating a source set comprising a subset of source logical addresses in at least one storage, e.g., the first target logical address 274 and transfer length 282 in the source logical unit 276, to copy to an indicated target set in the at least one storage comprising a subset of target logical addresses, e.g., the first target logical address 128 and transfer length 282 in the target logical unit 276. In response to this copy command for an FBA architecture, the copy manager 12 generates (at block 302) a point-in-time (PiT) copy establish 50 command indicating the source and target sets from the received copy command 270 and a background copy operation in field 52.

The copy manager 12 executes (at block 304) the generated PiT copy establish command 50 and may perform the operations described with respect to FIGS. 5a and 5b to generate the necessary PiT copy relationship 14 information, including source 20 and target 22 relationship information and a copy map 24. The copy manager 12 generates (at block 306) copy information indicating the source set of source logical addresses and the target set of target logical addresses, such as the source relationship information 20 and the target relationship information 22. The copy manager 12 further generates (at block 308) a copy map 24 including a plurality of indicators, such as bits in a bitmap. Each of the indicators represents a plurality of the target logical addresses, such as a target track, and include copy indicators representing tracks of target logical addresses in the target set that have not been updated with the corresponding source logical addresses since the copy relationship 14 was established.

After generating the necessary data structures and copying source logical addresses in only a partial target track according to FIGS. 5a and 5b, a complete is returned (at block 310) to the PiT copy establish command 50. In response to receiving the complete of the PiT copy establish command 50, the copy manager 12 returns (at block 312) complete to the copy command 270 and initiates (at block 314) the background copy operation indicated in the PiT copy establish command 50, such as described with respect to FIG. 7. In certain embodiments, the complete is returned to the copy command 270 before executing the background copy operation (at block 314).

In certain embodiments, the source tracks including the source set in the source storage 6a may be different numbered tracks than the target tracks including the target set of logical addresses. Further, the source tracks and the target tracks including the source and target sets may be in the same or different volumes.

With the described embodiments, the copy command from the host may be for a different data storage architecture than that the controller 2 uses to store data in the volumes 6a, 6b and the copy command may be synchronous, requiring complete to be returned only after all the physical data is copied. The copy manager 12 implements the copy command in a PiT copy establish command intended for a different data storage environment. Complete is returned immediately to the host before all the data is copied and after the necessary PiT copy relationship information is created so that the data is copied asynchronously. In this way a synchronous copy command directed to a FBA storage architecture is converted to an asynchronous copy operation in a track based architecture.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without depart-

What is claimed is:

1. A computer program product for processing a copy command involving at least one storage, wherein the computer program product comprising a non-transitory computer readable storage medium having computer readable program code embodied therein that executes to cause operations, the operations comprising:

generating a point-in-time (PiT) copy establish command for a source set comprising a subset of source logical addresses in a source volume, comprising less than all source logical addresses in the source volume, in the at least one storage to copy to an indicated target set comprising a subset of target logical addresses in a target volume, comprising less than all target logical addresses in the target volume, in the at least one storage, wherein the PiT copy establish command indicates the source and target sets, wherein the source logical addresses map to source tracks in the at least one storage and wherein the target logical addresses map to target tracks; and submitting the PiT copy establish command to a copy manager to cause the copy manager to generate copy information including first copy indicators for the target set of target logical addresses to indicate to copy the source logical addresses in the source set to the target set of target logical addresses and including second copy indicators for target logical addresses in the target volume outside of the target set to which source logical addresses are not copied, wherein the copy information is generated before initiating copying of the source set of logical addresses to the target set of logical addresses.

2. The computer program product of claim 1, wherein the PiT copy establish command is generated in response to a copy command indicating the source set and the target set, wherein the copy command is directed to data stored in a first data storage architecture and wherein the PiT copy establish command is used for data stored in a second data storage architecture different form the first data storage architecture.

3. The computer program product of claim 1, wherein the PiT copy establish command is generated in response to receiving a copy command indicating the source set and the target set, wherein the operations further comprise:

receiving complete to the PiT copy establish command after generating the copy information and before copying all the source logical addresses to the target logical addresses; and returning of complete to the copy command in response to receiving the complete to the PiT copy establish command.

4. The computer program product of claim 1, wherein the source tracks including the source set are different numbered tracks than the target tracks including the target set of target logical addresses.

5. The computer program product of claim 1, wherein logical addresses comprise logical block addresses (LBAs) and wherein the source tracks and the target tracks are in a same volume or in different volumes in the at least one storage.

6. The computer program product of claim 1, wherein the generated PiT copy establish command indicates a background copy operation to cause the copying of the source set of source logical addresses to the target set of target logical addresses that are indicated as having not been copied.

7. The computer program product of claim 6, wherein the operations further comprise:

executing the background copy operation to copy the source set to the target set by selecting a source track including source logical addresses in the source set to copy to a corresponding target track including target logical addresses in the target until the source set has been copied to the target set.

8. The computer program product of claim 7, wherein the operations further comprise:

returning complete to a copy command indicating the source set and the target set after generating the copy information and before copying all the source logical addresses to the target logical addresses and before executing the background copy operation.

9. The computer program product of claim 1, wherein the source volume and the target volume comprise a same volume in the at least one storage.

10. The computer program product of claim 1, wherein the operations further comprise:

determining whether only a portion of a first target track and/or a last target track in the target set include logical addresses in the target set; and copying source logical addresses to the first target track and/or the last target track in response to determining that only the portion of the first target track and/or the last target track include logical addresses in the target set, wherein the copying the source logical addresses to the first target track and/or the last target track is performed before initiating the copying of the source set of logical addresses to the target set of logical addresses other than the first target track and/or the last target track including only the portion of the target set.

11. A system in communication with at least one storage, comprising:

a processor; and a computer readable storage medium including computer program code executed by the processor to perform operations, the operations comprising:

generating a point-in-time (PiT) copy establish command for a source set comprising a subset of source logical addresses in a source volume, comprising less than all source logical addresses in the source volume, in the at least one storage to copy to an indicated target set comprising a subset of target logical addresses in a target volume, comprising less than all target logical addresses in the target volume, in the at least one storage wherein the PiT copy establish command indicates the source and target sets, wherein the source logical addresses map to source tracks in the at least one storage and wherein the target logical addresses map to target tracks; and submitting the PiT copy establish command to a copy manager to cause the copy manager to generate copy information including first copy indicators for target set of target logical addresses to indicate to copy the source logical addresses in the source set to the target set of target logical addresses and including second copy indicators for target logical addresses in the target volume outside of the target set to which source logical addresses are not copied, wherein the copy information is generated before initiating copying of the source set of logical addresses to the target set of logical addresses.

12. The system of claim 11, wherein the PiT copy establish command is generated in response to a copy command indicating the source set and the target set, wherein the copy command is directed to data stored in a first data storage architecture and wherein the PiT copy establish command is used for data stored in a second data storage architecture different form the first data storage architecture.

13. The system of claim 12, wherein the first data storage architecture comprises a Fixed Block Address (FBA) architecture and wherein the second data storage architecture comprises a track storage architecture where data is stored in track locations in volumes.

14. The system of claim 11, wherein the PiT copy establish command is generated in response to receiving a copy command indicating the source set and the target set, wherein the operations further comprise:
receiving complete to the PiT copy establish command after generating the copy information and before copying all the source logical addresses to the target logical addresses; and
returning of complete to the copy command in response to receiving the complete to the PiT copy establish command.

15. The system of claim 11, wherein the generated PiT copy establish command indicates a background copy operation to cause the copying of the source set of source logical addresses to the target set of target logical addresses that are indicated as having not been copied.

16. The system of claim 15, wherein the operations further comprise:
executing the background copy operation to copy the source set to the target set by selecting a source track including source logical addresses in the source set to copy to a corresponding target track including target logical addresses in the target until the source set has been copied to the target set.

17. The system of claim 11, wherein the source volume and the target volume comprise a same volume in the at least one storage.

18. The system of claim 11, wherein the operations further comprise:
determining whether only a portion of a first target track and/or a last target track in the target set include logical addresses in the target set; and
copying source logical addresses to the first target track and/or the last target track in response to determining that only the portion of the first target track and/or the last target track include logical addresses in the target set, wherein the copying the source logical addresses to the first and/or the last target track is performed before initiating the copying of the source set of logical addresses to the target set of logical addresses other than the first and/or the last target track including only the portion of the target set.

19. A method, comprising:
generating a point-in-time (PiT) copy establish command for a source set comprising a subset of source logical addresses in a source volume, comprising less than all source logical addresses in the source volume, in at least one storage to copy to an indicated target set comprising a subset of target logical addresses in a target volume, comprising less than all target logical addresses in the target volume, in the at least one storage, wherein the PiT copy establish command indicates the source and target sets, wherein the source logical addresses map to source tracks in the at least one storage and wherein the target logical addresses map to target tracks; and submitting the PiT copy establish command to a copy manager to cause the copy manager to generate copy information including first copy indicators to indicate to copy the source logical addresses in the source set to the target set of target logical addresses and including second copy indicators for logical addresses in the target volume outside of the target set to which source logical addresses are not copied, wherein the copy information is generated before initiating copying of the source set of logical addresses to the target set of logical addresses.

20. The method of claim 19, wherein the PiT copy establish command is generated in response to a copy command indicating the source set and the target set, wherein the copy command is directed to data stored in a first data storage architecture and wherein the PiT copy establish command is used for data stored in a second data storage architecture different form the first data storage architecture.

21. The method of claim 20, wherein the first data storage architecture comprises a Fixed Block Address (FBA) architecture and wherein the second data storage architecture comprises a track storage architecture where data is stored in track locations in volumes.

22. The method of claim 19, wherein the PiT copy establish command is generated in response to receiving a copy command indicating the source set and the target set, comprising:
receiving complete to the PiT copy establish command after generating the copy information and before copying all the source logical addresses to the target logical addresses; and
returning of complete to the copy command in response to receiving the complete to the PiT copy establish command.

23. The method of claim 19, wherein the generated PiT copy establish command indicates a background copy operation to cause the copying of the source set of source logical addresses to the target set of target logical addresses that are indicated as having not been copied.

24. The method of claim 23, further comprising:
executing the background copy operation to copy the source set to the target set by selecting a source track including source logical addresses in the source set to copy to a corresponding target track including target logical addresses in the target until the source set has been copied to the target set.

25. The method of claim 19, wherein the source volume and the target volume comprise a same volume in the at least one storage.

26. The method of claim 19, further comprising:
determining whether only a portion of a first target track and/or a last target track in the target set include logical addresses in the target set; and
copying source logical addresses to the first target track and/or the last target track in response to determining that only the portion of the first target track and/or the last target track include logical addresses in the target set, wherein the copying the source logical addresses to the first and/or the last target track is performed before initiating the copying of the source set of logical addresses to the target set of logical addresses other than the first target track and/or the last target track including only the portion of the target set.

* * * * *